United States Patent
Winter et al.

(10) Patent No.: US 12,370,589 B2
(45) Date of Patent: Jul. 29, 2025

(54) REMOTE CONTROL OF A PLANT FOR PRODUCING AND/OR TREATING A ROLLED PRODUCT MADE OF METAL

(71) Applicant: PRIMETALS TECHNOLOGIES GERMANY GMBH, Erlangen (DE)

(72) Inventors: Gunther Winter, Neunkirchen/Brand (DE); Hans-Juergen Zeiher, Erlangen (DE)

(73) Assignee: PRIMETALS TECHNOLOGIES GERMANY GMBH (DE)

(*) Notice: Subject to any disclaimer, the term of this patent is extended or adjusted under 35 U.S.C. 154(b) by 491 days.

(21) Appl. No.: 17/775,479

(22) PCT Filed: Nov. 18, 2020

(86) PCT No.: PCT/EP2020/082551
§ 371 (c)(1),
(2) Date: May 9, 2022

(87) PCT Pub. No.: WO2021/099397
PCT Pub. Date: May 27, 2021

(65) Prior Publication Data
US 2022/0410235 A1    Dec. 29, 2022

(30) Foreign Application Priority Data
Nov. 20, 2019   (EP) .................... 19210379

(51) Int. Cl.
*G05B 19/418* (2006.01)
*B21B 37/72* (2006.01)
(Continued)

(52) U.S. Cl.
CPC ............. *B21B 37/72* (2013.01); *G05B 13/04* (2013.01); *G05B 19/4185* (2013.01); *B21B 37/58* (2013.01); *B21B 37/74* (2013.01)

(58) Field of Classification Search
CPC ......... B21B 37/72; B21B 37/58; B21B 37/74; G05B 13/04; G05B 19/4185; G05B 19/042; Y02P 90/02
See application file for complete search history.

(56) References Cited

U.S. PATENT DOCUMENTS

| | | | |
|---|---|---|---|
| 6,860,950 B2 | 3/2005 | Franz et al. | 148/503 |
| 10,735,691 B2 † | 8/2020 | Schmirler | |

(Continued)

FOREIGN PATENT DOCUMENTS

| | | |
|---|---|---|
| CN | 102836886 A | 12/2012 |
| CN | 109874338 A | 6/2018 |

(Continued)

OTHER PUBLICATIONS

S. Almowuena, M. M. Rahman, C.-H. Hsu, A. A. Hassan and M. Hefeeda, "Energy-Aware and Bandwidth-Efficient Hybrid Video Streaming Over Mobile Networks," in IEEE Transactions on Multimedia, vol. 18, No. 1, pp. 102-115, Jan. 2016 (Year: 2016).*

(Continued)

*Primary Examiner* — Christopher E. Everett
(74) *Attorney, Agent, or Firm* — OSTROLENK FABER LLPP

(57) ABSTRACT

Sensors detect states of units of a plant for producing and/or treating a rolled product made of metal and transmit them to an automation system. The state signals (Z) are, in part, dimensional signals. The automation system determines, by taking into account the state signals (Z), control signal signals (S) for actuators associated with the units and actuates the actuators accordingly. The automation system includes at least one model-based system which models the behavior of the system and/or of the rolled product in real time. The automation system transmits the state signals (Z), the control signals (S) and/or signals derived therefrom at least in part via an open data network to a human-machine (Continued)

interface arranged at an operating location. The transmitted signals comprise at least one of the dimensional signals. The automation system takes specifications (V) from the human-machine interface in determining the control signals (S).

18 Claims, 8 Drawing Sheets

(51) Int. Cl.
  *G05B 13/04* (2006.01)
  *B21B 37/58* (2006.01)
  *B21B 37/74* (2006.01)

(56) References Cited

U.S. PATENT DOCUMENTS

| | | | |
|---|---|---|---|
| 10,796,156 B2 † | 10/2020 | Billi | |
| 10,908,566 B2 | 2/2021 | Gafur et al. | |
| 11,294,338 B2 † | 4/2022 | Bettinger | |
| 2006/0241793 A1 | 10/2006 | Skourup et al. | 700/83 |
| 2014/0047106 A1* | 2/2014 | Leung | H04L 43/12 709/224 |
| 2016/0127690 A1* | 5/2016 | Kaehler | G06V 20/52 348/143 |
| 2018/0129276 A1* | 5/2018 | Nguyen | G06F 3/0304 |
| 2018/0131907 A1* | 5/2018 | Schmirler | H04N 23/698 |
| 2019/0361409 A1* | 11/2019 | Bettinger | G05B 13/0265 |

FOREIGN PATENT DOCUMENTS

| | | | | |
|---|---|---|---|---|
| CN | 109530461 A | | 3/2019 | |
| DE | 102008028777 A1 | | 12/2009 | |
| DE | 102017121098 A1 | | 3/2019 | |
| EP | 3293594 A1 | * | 3/2018 | ............ B21B 37/00 |
| WO | WO 03/000940 A1 | | 1/2003 | |
| WO | WO 2017/133814 A1 | | 8/2017 | |
| WO | WO 2018/050438 A2 | | 3/2018 | |

OTHER PUBLICATIONS

Notice of Allowance dated Oct. 30, 2023 issued in corresponding Japanese Patent Application No. 2022-529366.
International Search Report mailed Feb. 16, 2021 in corresponding PCT International Application No. PCT/EP2020/082551.
Written Opinion Report mailed Feb. 16, 2021 in corresponding PCT International Application No. PCT/EP2020/082551.
European Search Report mailed May 19, 2020 in corresponding European Application No. EP19210379.4.
Office Action dated Dec. 11, 2024 in corresponding Chinese Patent Application No. 202080080276.9.
5G Alliance for Connected Industries and Automation, "5G for Connected Industries and Automation (White Paper—Second Edition)," published online at https://www.zvei.org/en/press-media/publications/5g-for- connected-industries-and-automation-white-paper-second-editon.†

* cited by examiner
† cited by third party

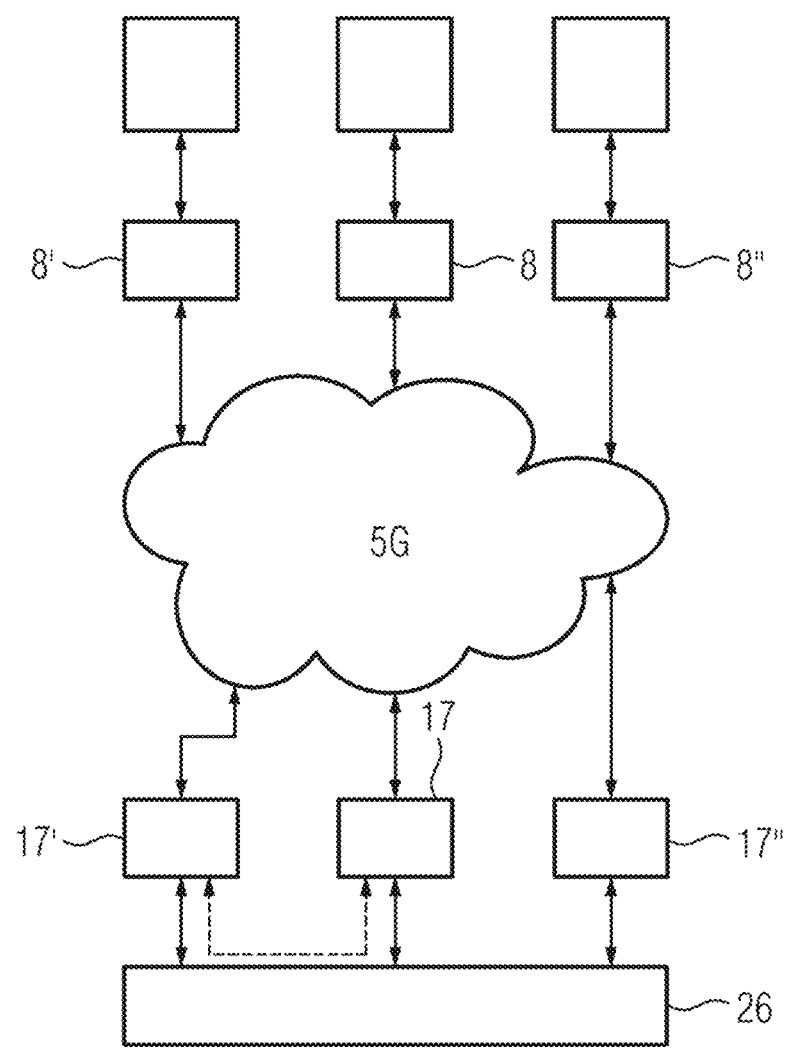

REMOTE CONTROL OF A PLANT FOR PRODUCING AND/OR TREATING A ROLLED PRODUCT MADE OF METAL

CROSS-REFERENCE TO RELATED APPLICATIONS

The present application is a 35 U.S.C. §§ 371 national stage application of PCT/EP2020/082551, filed Nov. 18, 2020, the contents of which are incorporated herein by reference, which claims priority of European Patent Application No. 19210379.4, filed Nov. 20, 2019, the contents of which are incorporated by reference herein. The PCT International Application was published in the German language.

TECHNICAL FIELD

The invention relates to an operating method for a plant for producing and/or treating a rolled product made of metal.

The present invention also relates to an integral plant consisting of a plant for producing and/or treating a rolled product made of metal.

PRIOR ART

Such systems and their associated operating procedures and integral systems are generally known. An example of such a system is a continuous casting system in which molten metal—for example steel—is cast into a metal strand. Another example of such a system is a rolling mill in which a metal strand is rolled into a smaller cross section. A casting/rolling plant, i.e. a plant in which a continuous casting system is combined with a rolling mill, is another example of such a system.

In the current state of the art these types of systems are operated by control personnel. The control personnel are usually located in a control station which is located on the same site as the system. The arrangement of the control station is such that the control personnel have direct visual contact with the system.

Such on-site operation and control is required in the prior art in fast and complex processes such as those performed in rolling mills, for the reason that only direct visual contact can guarantee the required fast response times for manual intervention.

In slow processes such as those that occur in the chemical industry, at least in some cases, remote control is known. Due to the fact that a remote control is carried out, the control station (often also referred to as a control room) can in principle be arranged at any location. In particular, it is not necessary to arrange the control station at a location where it is exposed directly to effects of the system (e.g. exposure to noise and dust). The distance from the system can be set as required. For example, it may cover a few kilometers. However, the system may also be hundreds of kilometers away.

Document WO 2018/050438 A2 discloses an operating procedure for a primary industrial system, in which significant status signals for the status of system units are acquired using sensors and transmitted to an automation system. The status signals are partly dimensional signals, i.e. signals that can only be used meaningfully in their temporal and/or local context. The automation system uses them to determine control signals for actuators of the system and controls the actuators accordingly. For this purpose, the automation system comprises a model-based system which models the behavior of the system and/or the rolled product. The automation system transmits at least some of the status signals to a human-machine interface and accepts control commands from the human-machine interface, which it takes into account when determining the control signals.

Document DE 102017 121 098 A1 discloses a control system for production processes in the metal-processing industry, in which objects—in particular workpieces—are tracked using cameras.

The images captured by the cameras are transmitted to a manufacturing system that can be arranged in the cloud. Orders for processing are then sent to the corresponding processing machines. The machines appear to be controlled locally on site.

The manufacturing system can also transmit schematic images to an operator.

A control system of a plant having multi-stage model optimization is known from DE 102008 028 777 A1. The control system can be used to control primary industrial systems, for example continuous casting systems, rolling mills and similar systems.

SUMMARY OF THE INVENTION

The object of the present invention is to create methods by means of which a remote control can also be implemented for systems for producing and/or treating a metal rolled product.

The object is achieved by an operating method as claimed. Advantageous embodiments of the operating method are specified in the dependent claims.

According to the invention, an operating method is created for a plant for the primary forming and/or re-forming of a rolled product made of metal,
  wherein significant status signals for states of units of the system are detected by means of sensors,
  wherein the detected status signals are transmitted from the sensors to an automation system,
  wherein part of the status signals detected by the sensors are dimensional signals,
  wherein dimensional signals are signals in which a single individual measured value only provides meaningful information about the status of the rolled product relative to a specific unit of the system or the system itself if it also takes into account the values adjacent to it in time and/or location,
  wherein the automation system, by taking into account the transmitted status signals, determines control signals for actuators associated with the units and activates the actuators according to the determined status signals,
  wherein the automation system determines part of the control signals by taking into account the dimensional signals,
  wherein the automation system comprises at least one model-based system which models the behavior of the system and/or the rolled product in real time on the basis of mathematical-physical equations,
  wherein the automation system feeds part of the status signals to the model-based system and determines part of the control signals for the actuators by means of the model-based system,
  wherein the automation system transmits at least part of the status signals, the control signals, and/or signals derived from the status signals and/or the control signals, via an open data network to a human-machine interface arranged at an operating site,
  wherein an open data network is a data network in which the automation system and the human-machine interface have no knowledge as to whether, and if so which, other components are connected to the data network, wherein the signals transmitted to the human-machine interface comprise at least one of the dimensional signals, wherein the human-machine interface accepts commands from an operator by operating predefined controls of the human-machine interface and transmits specifications corresponding to the commands to the automation system via the open data network, wherein the automation system takes the specifications into account when determining the control signals, wherein the transmission over the open data network takes place in both communication directions with a probability of at least 99.95% with a maximum latency time of 50 ms and the bandwidth of the transmission between the automation system and the human-machine interface is sufficiently large that at least one video data stream with a resolution of 800×600 pixels per video frame and 20 video frames per second can be transmitted within the maximum latency time, wherein the automation system decides which dimensional signals it transmits to the human-machine interface according to the status of the rolled product and/or the system, and/or the human-machine interface determines which dimensional signals it outputs to the operator and in which scope according to the status of the rolled product and/or the system, wherein the human-machine interface determines the specifications dynamically as a function of the actuation of the predefined controls and additionally as a function of the status of the rolled product and/or the system.

The present invention is based on the recognition that visual information in particular is required for controlling the system. It is therefore necessary to be able to transmit video data from the location of the system to the operating location. This defines the performance of the open data network (number of images per second and their resolution). Due to the dynamic nature of the system, the images must also be available in near real time. This requirement is taken into account by the maximum permitted latency. Furthermore, the video data must be available in a reliable manner. This requirement is taken into account by the transmission reliability of 99.95% or above.

It is possible that the rolled product has yet to be rolled. Alternatively, it could already be a rolled product.

Treating a rolled product is a process in which a characteristic of the rolled product is permanently changed. For example, it could be a rolling operation as such. In this case, the cross-section of the rolled product is modified, for example in the case of flat rolled product, mainly its thickness. Alternatively or in addition, it can be a thermal treatment, for example cooling in a cooling track downstream of a rolling mill or in a stand-alone annealing system, in particular in a so-called CAL=continuous annealing line. In this case, the micromechanical properties of the rolled product are changed, which in turn determine the macromechanical properties such as tensile strength and elastic limit. Alternatively, it may involve a coating of a rolled product, for example galvanizing in a CGL=continuous galvanizing line. In a CGL, a thermal treatment is usually carried out together with the coating. For example, none of the treatments of the rolled product involves a mere transportation from A to B.

Due to the dimensionality of some of the status signals and the evaluation of such signals based thereon, a considerably more extensive automation of the operation of the system is possible than in the prior art.

Due to the communication between the automation system and the human-machine interface via the open data network, the human-machine interface can be arranged anywhere.

The probability of at least 99.95% represents a minimum requirement. In many cases, the probability is even higher, for example 99.99% or 99.999%.

The specified maximum latency of 50 ms represents a minimum requirement. Preferably, the maximum latency time has a lower value, such as 20 ms or 10 ms. Even lower values of 5 ms, 2 ms or 1 ms are conceivable.

The required bandwidth, i.e. a bandwidth that allows a video data stream to be transmitted with a resolution of 800×600 pixels per video image and 20 video images per second, represents a minimum requirement. Of course, larger bandwidths can also be implemented that have correspondingly higher performance. For example, this can allow multiple such data streams to be transmitted and/or the video images to have a higher resolution and/or more images to be transmitted per second. It is also not crucial that such a video stream is transmitted. The crucial factor is that the bandwidth enables such a transmission. The specified image aspect ratio of 800:600=4:3 is also not mandatory.

Due to the specified performance of the open data network, sufficient data exchange is ensured in both communication directions both in terms of the volume of the signals transmitted and in terms of the latency. The transmission and/or output of dimensional signals as a function of the status of the rolled product and/or the system ensures that the operator can display the currently relevant signals in a more or less central position. Due to the determination of the specifications not only as a function of the operation of the predefined controls but also as a function of the status of the rolled product and/or the system, the operator does not need to switch between different controls, but can always operate the same controls. This can significantly reduce operator errors and possibly even completely avoid them.

As already mentioned, the system can comprise a continuous casting system and/or a rolling mill. A cooling track can be arranged downstream of the rolling mill. Alternatively or in addition, the system may comprise a treatment line for the thermal treatment and/or surface treatment of the rolled product, such as a CAL or a CGL.

Preferably at least one sub-section of the open data network is designed at least in accordance with the 5G standard. In particular using such a standard, the required performance can be easily achieved. The data transmission can be completely or partially wireless. However, a wired data transmission is also possible.

In a further preferred embodiment, a geometric-structural model of the system is implemented in the human-machine interface, wherein the human-machine interface also outputs at least part of the geometric-structural model to the operator. In this case, the human-machine interface visually highlights, in the output geometric-structural model or in the output portion of the geometric-structural model, the region or at least one of the regions that the automation system transmits to the human-machine interface depending on the status of the rolled product and/or the system, and/or from the region of which the dimensional signals originate, which the human-machine interface outputs to the operator depending on the status of the rolled product and/or the system and/or for which the specifications are determined which the human-machine interface dynamically determines depending on the status of the rolled product and/or the system.

This makes it easier for the operator to record the actual events at the system location.

Geometrical-structural models and their integration into a human-machine interface are known per se. Document US 2006/0 241 793 A1 can be referred to as an example. In contrast to US 2006/0 241 793 A1, the status-dependent highlighting in the present invention does not only take place in the case of emergencies or special states outside of the normal operation of the system, but in the normal operation of the system.

Preferably, the communication between the automation system and the human-machine interface takes place in compressed form. Data compression is well known to persons skilled in the art. In particular for video data, reference can be made to the well-known MPEG standard.

As an alternative or in addition to compressed data transmission, it is also possible that communication between the automation system and the human-machine interface takes place in encrypted form. In particular, this approach increases the protection of the communication against unauthorized access.

In the simplest case, only the human-machine interface is present at the operating location. However, it is also possible to have at least one other human-machine interface arranged at the operating location in addition to the human-machine interface. In this case, if the additional human-machine interface is networked with the first-mentioned human-machine interface, the operating method is preferably configured in such a way that the operator can transfer the communication with the automation system dynamically from the human-machine interface to the other human-machine interface and back by specifying appropriate transfer commands. This enables the operator to determine, in particular dynamically, which of the human-machine interfaces communicates with the automation system.

Preferably, at least part of the status signals fed to the model-based system from the automation system are dimensional signals. This also improves the evaluation of the status signals by the model-based system.

The object is also achieved by means of an integral plant as claimed. Advantageous embodiments of the integral plant are specified in the dependent claims.

According to the invention, an integral plant of a plant for producing and/or treating a rolled product made of metal is created,
  wherein the integral plant has sensors located at the location of the system, by means of which significant status signals for states of units of the system are detected,
  wherein the integral plant has an automation system that is connected to the sensors for transmitting the detected status signals from the sensors to the automation system,
  wherein part of the status signals detected by the sensors are dimensional signals,
  wherein dimensional signals are signals in which a single individual measured value only provides meaningful information about the status of the rolled product 2 relative to a specific unit of the system or the system itself if it also takes into account the values adjacent to it in time and/or location,
  wherein the integral plant has actuators located at the site of the system and associated with the units,
  wherein the automation system determines control signals for actuators taking into account the transferred status signals,
  wherein the actuators are connected to the automation system for controlling the actuators in accordance with the determined control signals,
  wherein the automation system determines part of the control signals by taking into account the dimensional signals,
  wherein the automation system comprises at least one model-based system which models the behavior of the system and/or the rolled product in real time on the basis of mathematical-physical equations,
  wherein the automation system feeds part of the status signals to the model-based system and determines part of the control signals for the actuators by means of the model-based system,
  wherein the integral plant has a human-machine interface which is arranged at an operating location and connected to the automation system via an open data network,
  wherein the automation system transmits at least part of the status signals, the control signals, and/or signals derived from the status signals and/or the control signals, via the open data network to the human-machine interface,
  wherein an open data network is a data network in which the automation system and the human-machine interface have no knowledge as to whether, and if so which, other components are connected to the data network,
  wherein the signals transmitted to the human-machine interface comprise at least one of the dimensional signals,
  wherein the human-machine interface accepts commands from an operator by operating predefined controls of the human-machine interface and transmits specifications corresponding to the commands to the automation system via the open data network,
  wherein the automation system takes the specifications into account when determining the control signals,
  wherein the transmission over the open data network takes place in both communication directions with a probability of at least 99.95% with a maximum latency time of 50 ms and the bandwidth of the transmission between the automation system and the human-machine interface is sufficiently large that at least one video data stream with a resolution of 800×600 pixels per video frame and 20 video frames per second can be transmitted within the maximum latency time,
  wherein the automation system decides which dimensional signals it transmits to the human-machine interface according to the status of the rolled product and/or the system, and/or the human-machine interface determines which dimensional signals it outputs to the operator and in which scope according to the status of the rolled product and/or the system,
  wherein the human-machine interface determines the specifications dynamically as a function of the actuation of the predefined controls and additionally as a function of the status of the rolled product and/or the system.

The advantageous embodiments of the integral plant and the advantages achieved therewith correspond to the embodiments of the operating method and the resulting advantages.

BRIEF DESCRIPTION OF THE DRAWINGS

The properties, features and advantages of the present invention described above and the manner in which these are achieved will become clearer and more comprehensible in conjunction with the following description of the exemplary embodiments, which are explained in more detail in connection with the drawings. In the drawings, in schematic representation:

FIG. 16 shows a plurality of systems from the primary industries with automation systems and a plurality of human-machine interfaces.

DESCRIPTION OF THE EMBODIMENTS

Figure 1:
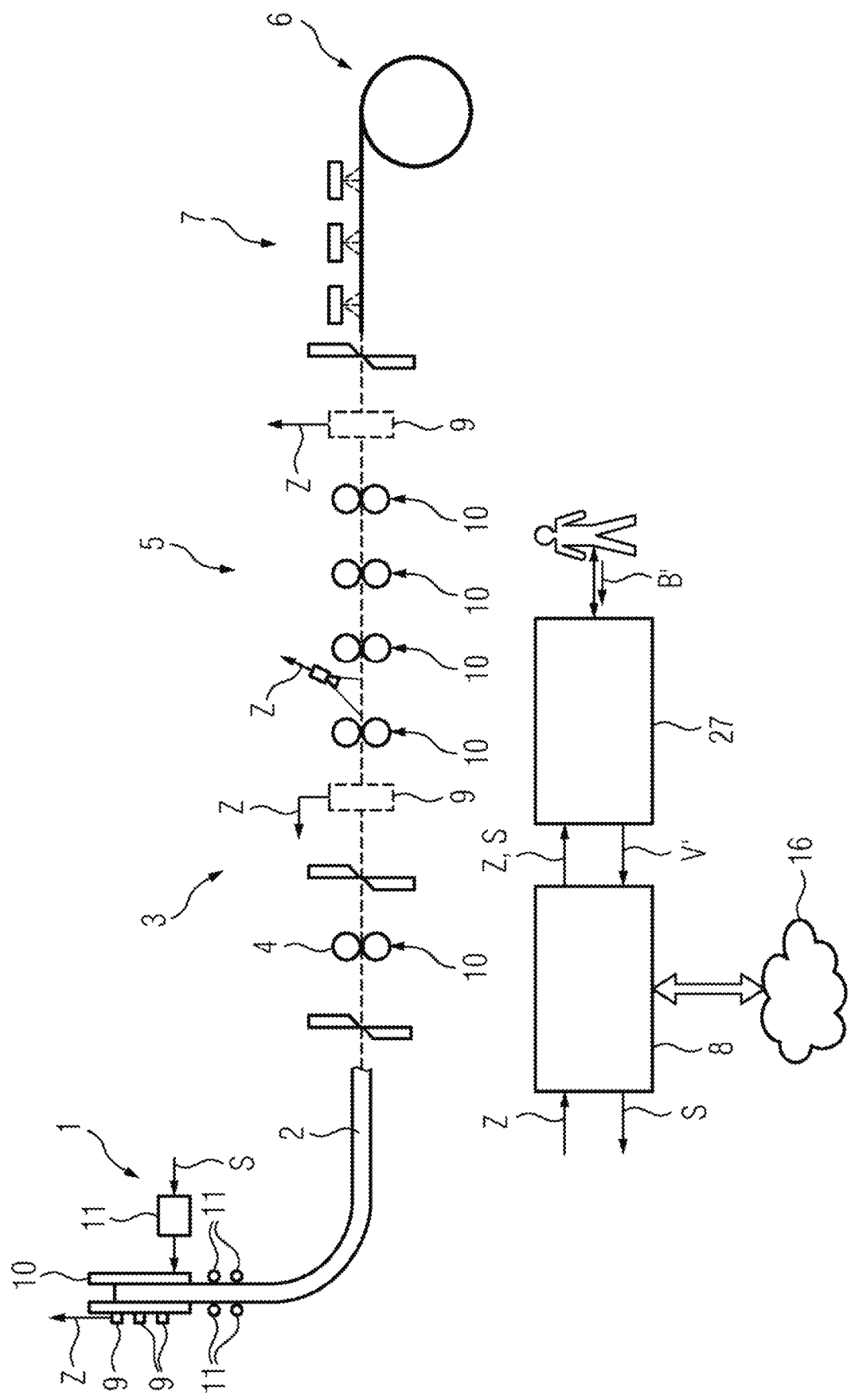
FIG. 1 shows a system from the primary industries and an automation system.

In accordance with FIG. 1, a primary industrial system has a subsystem 1 for the primary forming of a rolled product 2 made of metal.

The rolled product 2 is thus a solid, in the case of primary forming, the already solidified metal. The subsystem 1 for the primary forming of the rolled product 2 can be designed, for example, as a continuous casting system according to the illustration in FIG. 1. The metal can be steel or aluminum, for example. By means of the subsystem 1, for example, a slab can be cast as the rolled product 2 (=primary forming), which will later be re-formed into a metal strip.

In accordance with FIG. 1, the primary industrial system also has a subsystem 3 for forming the rolled product 2. The subsystem 3 for forming the rolled product 2 can be designed in particular as a rolling mill. The rolling mill can be a single-stand roughing rolling mill 4 or a multi-stand roughing rolling line. Alternatively, the rolling mill can be a Steckel rolling mill or a multi-stand production line 5. The rolled product 2 is hot during roughing rolling and when rolling the finished product. However, the rolling mill can also be a cold rolling mill. In the case of a multi-stand production line 5, a reel 6 is usually arranged downstream of the production line. In the case of a production line 5, a cooling track 7 can also be arranged downstream of the rolling mill. The cooling track 7, if present, is located between the rolling mill and the reel 6. In a cold rolling mill, for example, a pickling line can be arranged upstream of the rolling mill. In the specific case, the subsystem 3 for forming the rolled product 1 is designed according to the illustration in FIG. 1 as a single-stand roughing rolling mill 4 (which therefore only has a single roughing roller stand) with a downstream multi-stand production line 5, a reel 6, and a cooling track 7 between production line 5 and reel 6. Furthermore, as part of the specific embodiment of FIG. 1, the rolled product 2 is a flat rolled product. All these specific embodiments, however, should only be considered as examples. Furthermore, of all the rolling stands, only the working rollers are shown in FIG. 1. However, the rolling stands can readily comprise further rollers, in particular support rollers and/or intermediate rollers. Corresponding rolling stands and their designs are well known to persons skilled in the art.

Other designs of the primary industrial system are also possible. For example, the system may be designed as an (isolated) treatment line for thermal treatment and/or surface treatment of the rolled product 2. In a treatment line for thermal treatment of the rolled product, micromechanical properties of the rolled product 2 are permanently altered. A treatment line for thermal treatment of the rolled product alters micromechanical properties, such as grain size and phase components. A typical thermal treatment line is an annealing process. In a treatment line for the surface treatment of the rolled product, as the name implies, the surface of the rolled product is altered. Typical treatment lines for surface treatment are a pickling line and a coating line. In a coating line, a thermal treatment of the rolled product 2 is often carried out in conjunction with the surface treatment.

According to the illustration in FIG. 1, the primary industrial system has both the subsystem 1 for the primary forming of the rolled product 2 and the subsystem 3 for re-forming the rolled product 2. In principle, however, it is sufficient if only the subsystem 1 for primary forming of the rolled product 2 or the subsystem 3 for re-forming of the rolled product 2 or another of the above-mentioned systems is present.

The primary industrial system is controlled by an automation system 8. The automation system 8 is usually arranged at the system location. This is not absolutely essential, however. The automation system 8 can, for example, be arranged at a different location and communicate with the system via data connections. For example, the automation system 8 can be arranged in the cloud. Mixed forms are also possible, i.e. where one part of the automation system 8 is arranged on site and another part of the automation system 8 is arranged at another location. The primary industrial system also has a plurality of sensors 9. Using the sensors 9, status signals Z are detected that are significant for states of units 10 of the system. The detected status signals Z are transmitted from the sensors 9 to the automation system 8. The sensors 9 are connected to the automation system 8 for this purpose. The automation system 8 determines control signals S for actuators 11. When determining the control signals S, the automation system 8 takes the status signals Z into account. The automation system 8 controls the actuators 11 according to the determined control signals S. The actuators 11 are connected to the automation system 8 for this purpose. The actuators 11 are associated with the units 10 of the system. The automation system takes the transmitted status signals Z into account when determining the control signals S.

In FIG. 1, only some of the sensors 9, units 10 and actuators 11 are shown. Generally speaking, the units 10, sensors 9 and actuators 11 can be determined as required. However, both the sensors 9 and the units 10 as well as the actuators 11 are arranged at the location of the system. Some possible units 10 and associated sensors 9 and actuators 11 are elucidated below. However, the explanations are only to be understood as examples. As required, other units 10 can also be present and/or in the case of identical units 10, other or additional sensors 9 and/or other or additional actuators 11 can be present.

For example, one of the units 10 can be implemented as a continuous casting mold of the continuous casting system. In this case, for example, the sensors 9 can be temperature sensors arranged on the side walls of the continuous casting mold. In this case, the temperature sensors are used to detect a generally two-dimensional pattern of temperatures. The evaluation of the detected temperatures by the automation system 8 is used in particular for the timely detection of a so-called sticker and the associated risk of a mold rupture. Related approaches are generally known to persons skilled in the art. Furthermore, the meniscus and the vertical position of the continuous casting mold can be detected. The automation system 8 controls in particular the oscillation of the continuous casting mold (in amplitude and possibly also frequency) and the continuous guide rollers, which are used to set the line haul-off speed.

Another of the units 10 can be designed, for example, as a rolling stand. In the case of a rolling stand, for example, appropriate sensors can be used to detect the speed and torque with which the rolling stand rollers (usually the working rollers) are driven. The rolling force and the roll gap or the placement position of the working rollers can also be acquired using appropriate sensors. By means of a sling hoist arranged upstream or downstream of the respective rolling stand, the tension in the rolled product 2 can be detected in front of or behind the respective rolling stand. The automation system 8 can control in particular the drive of the rollers of the respective rolling stand, actuators for adjusting the roll gap or the rolling force of the respective rolling stand as well as, in relation to the respective rolling stand, actuators for adjusting a roller bend, actuators for adjusting a roll gap wedge, heating elements, cooling elements, a roller lubrication, and others. A camera can be used, for example, to capture an image of the rolled product 2 as it emerges from the rolling stand in question.

For example, in certain sections of the system—for example, between the roughing rolling mill 4 and the production line 5, between the production line 5 and the cooling track 7, and between the cooling track 7 and the reel 6—temperature measuring stations can be arranged for measuring the respective temperature of the rolled product 2. The temperatures recorded before the production line 5 can be used by the automation system 8 in particular for determining the rolling forces of the rolling stands of the production line 5 and for determining the actuation of intermediate stand coolers in the production line 5. The temperatures recorded after the production line 5 can be used by the automation system 8 in particular for adapting a model of the production line 5 and for determining the actuation of cooling devices of the cooling track 7. The temperatures recorded after the cooling track 7 can be used by the automation system 8 in particular for adapting a model of the cooling track 7.

In certain sections of the system—for example in front of the roughing rolling mill 4, between the roughing rolling mill 4 and the production line 5, and behind the production line 5—shears may also be arranged which can be controlled by the automation system 8 as required, to separate the rolled product 2 into different sections or to cut out the sections of the rolled product 2.

The sensors 9 thus comprise on the one hand "normal" sensors that detect "normal" status signals Z such as rotation speed, torque or current of a drive of the system (for example, a drive for a rolling stand), position (for example roller gap or placement position of working rollers), pressure (for example roller force), etc. Such status signals Z are dimensionless in the sense that even a single status signal Z can be meaningfully evaluated as such independently of other status signals Z.

In addition, the sensors 9 also comprise detection systems that supply dimensional signals as the status signals Z and provide them to the automation system 8. Dimensional signals are signals in which a single individual measured value cannot provide meaningful information about the status of the rolled product 2 relative to a specific unit of the system or the system itself without also taking into account the values adjacent to it in time and/or location. A typical example of a dimensional signal is an acoustic signal that is detected by a microphone or other sound sensor. In the case of such a signal, only the chronological sequence and the vibration defined thereby can be meaningfully evaluated. Another typical example are two- or three-dimensional, or generally multi-dimensional, images. Such images can be "normal" two-dimensional optical images as captured with a camera. They can also be three-dimensional images, however, i.e. images that also include depth information. Such depth images may be based on radar or lidar or interference techniques, for example. The dimensional signals can also be fed to the automation system 8 on site and evaluated by the latter in order to determine control signals S for the actuators 11.

Captured images can be determined, for example, in such a way that they enable the position of the rolled product 2 relative to a unit 10 of the system to be determined. A typical example of this, in the case where the rolled product 2 is a metal strip, is the lateral offset of the metal strip in conjunction with the angle at which the metal strip enters or exits a rolling stand—for example, a rolling stand of the production line 5. However, other states of the rolled product 2 can also be detected, for example its direction of motion as such, or its speed.

The automation system 8 determines some of the control signals S using only the "normal" status signals Z, i.e. without using dimensional signals. To determine a number of such control signals S, the automation system 8 can comprise a model-based system that models the behavior of the system and/or the rolled product 2 on the basis of mathematical-physical equations. These modeling functions must be carried out in real time, as they are used to determine control signals S. An example of such a model-based system is the modeling of the forming of steel in the production line 5, or the modeling of the temporal profile of the temperature and the phase transformation of steel in the production line 5 and/or in the cooling track 7. Examples of such systems are explained in detail in WO 2003/000 940 A1, WO 2003/045599 A1, WO 2004/076 085 A2 and WO 2005/076 092 A1.

At least some of the status signals Z are therefore fed to the respective model-based system by the automation system 8 and taken into account when determining the corresponding control signals S. At least some of the control signals S are thus determined by the automation system 8 using a corresponding model-based system.

The automation system 8 determines another part of the control signals S by taking the dimensional signals into account. As already mentioned, for example, cameras can be used to capture images of the rolled product 2 showing the discharge of the rolled product 2 from the rolling stands of the production line 5. Based on the captured images, the lateral position and the angle under which the rolled product 2 is discharged from the respective rolling stand can then be determined. As a function of these variables, the pivot position of the corresponding rolling stand can then be tracked and corrected. An example of a corresponding procedure can be found in WO 2017/133 814 A1. Self-learning systems can also be used to evaluate the dimensional signals. Purely as an example, reference can be made to WO 2018/050 438 A2. In both cases, intelligent assistance systems can be created that automatically assume additional control functions that are performed by a person in the prior art.

The procedure according to WO 2017/133 814 A1 is also an example of a dimensional status signal Z being fed to and evaluated by a model-based system of the automation system 8 and taken into account in determining control signals S. Other embodiments are also possible, however.

The example cited produces a corresponding strip run control in the production line 5. A similar procedure is also possible for the roughing rolling mill 4. The control of the strip run in a roughing rolling mill 4 is generally known to persons skilled in the art as wedge-and-camber control. In a similar manner, wedge and saber control or flatness control can be automated.

Figure 2:
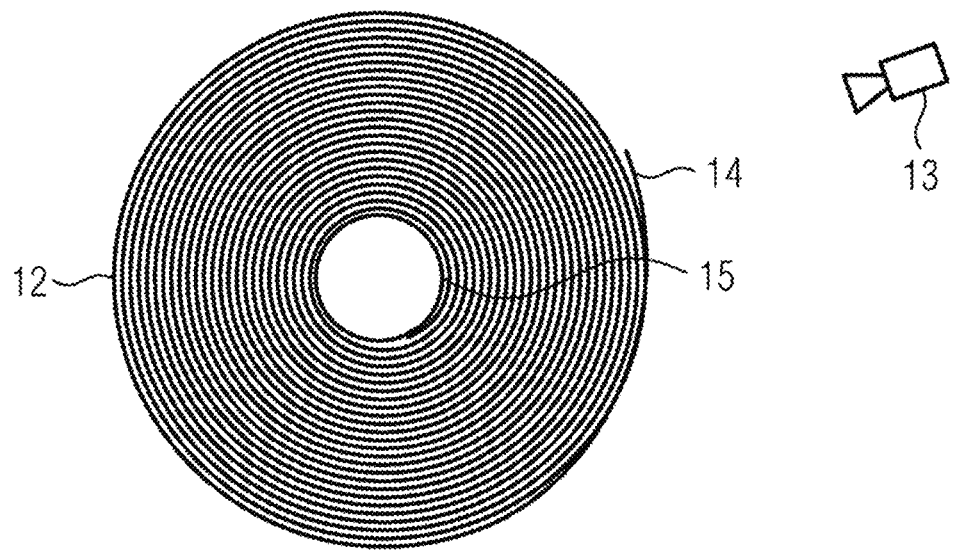
FIG. 2 shows a coil being reeled.
Figure 3:
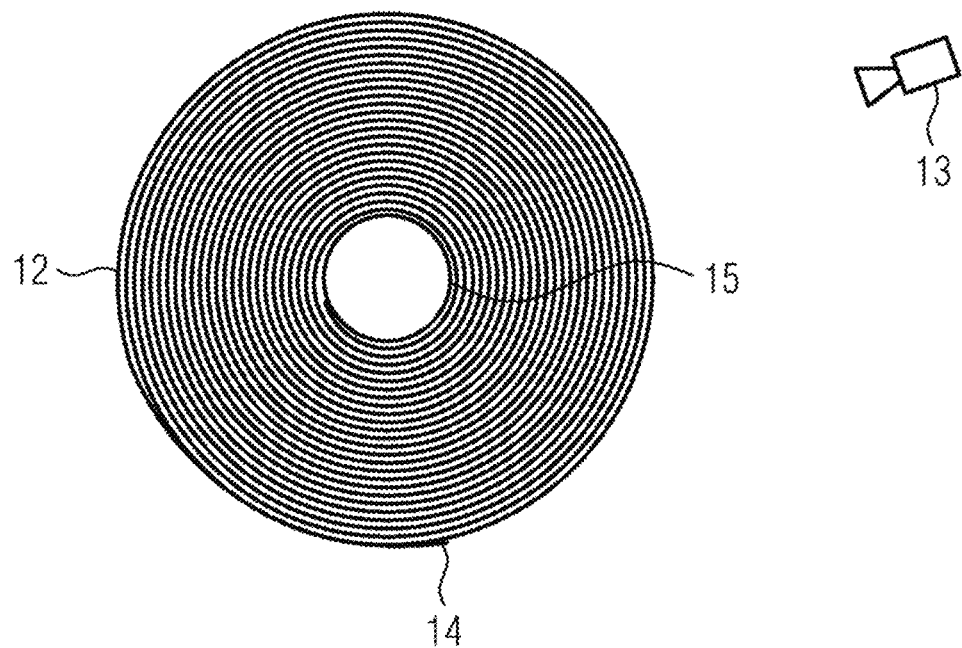
FIG. 3 shows the coil of FIG. 2 after reeling.

Another example is reeling on a strip into a coil 12 after the rolling. In this case, for example, a corresponding camera 13 can be used in accordance with the illustration in FIG. 2 to capture when the strip foot 14 (i.e. the end of the strip) has a certain position relative to the coil eye 15, for example, when it is slightly more than 90° in front of the lowest point of the coil 12 as viewed in the direction of rotation of the coil 12. In this case, the reeling on of the strip can be controlled by the automation system 8 in such a way that when the reeling is finished, the distance from the strip foot 14 to the lowest point of the reeled coil 12 is only a few percent—preferably 5% or less—of the coil circumference, as shown in FIG. 3. The strip foot 14 is thus arranged almost directly below the coil eye 15 and is clamped to a support when the coil 12 is deposited. The last winding of the coil 12 can thus be prevented from unintentionally springing open.

Figure 4:
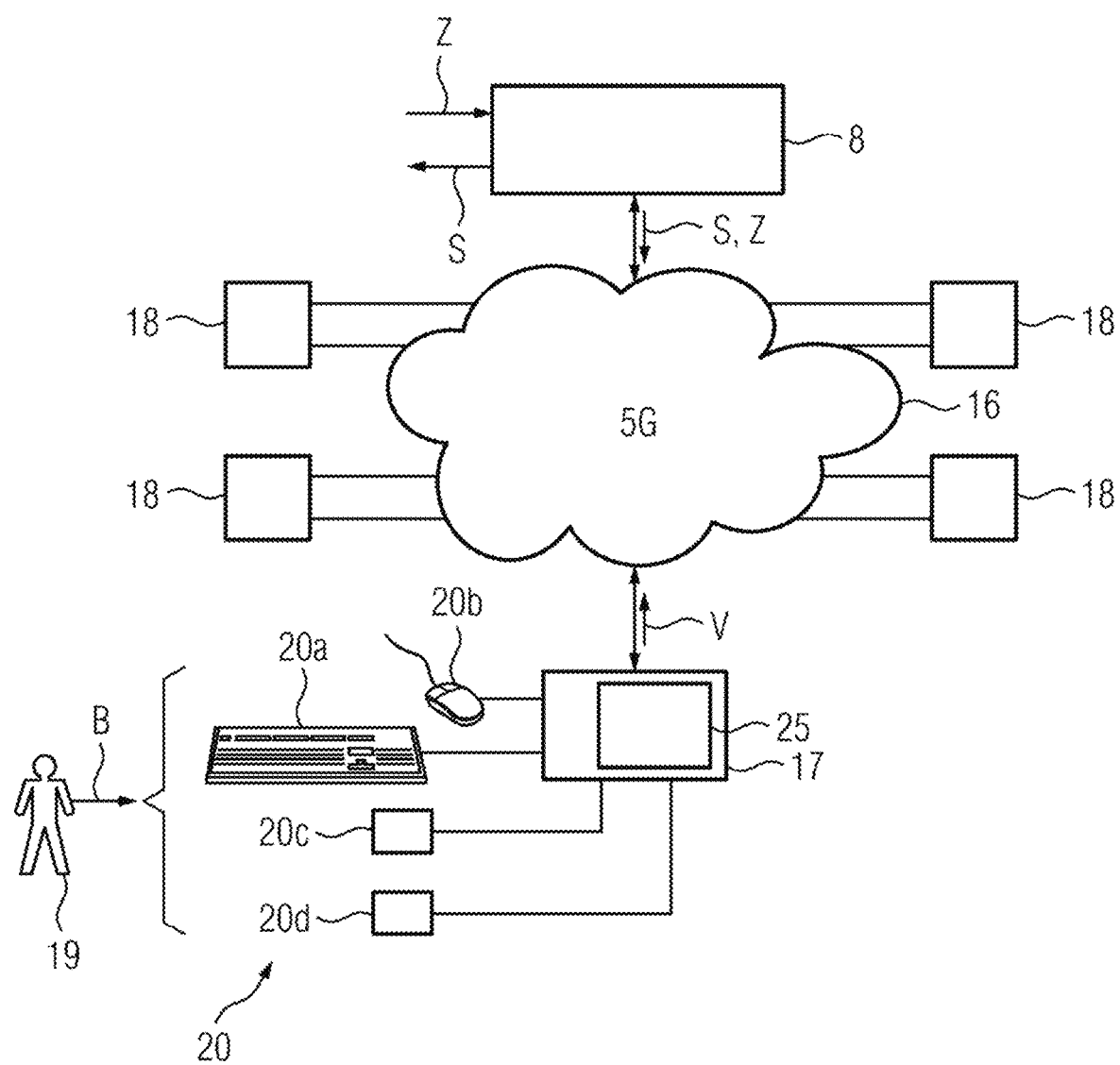
FIG. 4 shows the automation system of FIG. 1 and a human-machine interface.

The automation system 8 is connected to a human-machine interface 17 via a data network 16, as shown in FIG. 4. The human-machine interface 17 is located at an operating location, possibly with other human-machine interfaces (see below). The operating location can be located near the system and/or the automation system 8. But it can also be a long distance from it, in extreme cases several 1000 km away. Via the data network 16, the automation system 8 transmits at least part of the status signals Z, the control signals S, and/or signals derived from the status signals Z and/or the control signals S to the human-machine interface 17. At least one of the transmitted signals is one of the dimensional signals, in particular a captured image or a captured acoustic signal.

The transmitted signals are output by the human-machine interface 17 to an operator 19. In the case of an image, for example, an output can be implemented via a screen or similar. The same applies to a sequence of signals (including a sequence of images) and also to dimensional signals generated by the automation system 8 as part of the evaluation of status signals Z. In the case of an acoustic signal, the output can be implemented, for example, via a loudspeaker or headphones. In addition, the human-machine interface 17 transmits specifications V to the automation system 8 via the data network 16. The automation system 8 takes the specifications V into account when determining the control signals S.

The data network 16 is an open data network. An open data network 16 is a data network to which, as shown in FIG. 4, any other components 18 can be connected and which also communicate with each other via the data network 16 without the automation system 8 or the human-machine interface 17 knowing anything about them.

The human-machine interface 17 accepts commands B from the operator 19 as shown in FIG. 4. The commands B can be specified, for example, as shown in FIG. 4, by operating predefined controls of the human-machine interface 17. The controls 20 can comprise a standard keyboard 20a, a standard mouse 20b, and special control keys 20c, 20d. Other controls 20 are also possible. Regardless of the type of control elements 20, however, the human-machine interface 17 derives the corresponding specifications V from the specified commands B.

The transfer via the data network 16 takes place in both communication directions (i.e. both from the automation system 8 to the human-machine interface 17 and from the human-machine interface 17 to the automation system 8) with a maximum latency time of 50 ms. Preferably, the maximum latency is even smaller, for example 20 ms, 10 ms or less. The maximum latency is maintained with a probability that is close to certainty, i.e. with a probability of at least 99.95%, or ideally of at least 99.99%.

The required bandwidth and the required latency as well as the guarantee of transmission security (i.e. maintaining the required probability of at least 99.95%) can be achieved in various ways. For example, streams can be set up between the automation system 8 and the human-machine interface 17. Streams are generally known to persons skilled in the art—not only for the transmission of video data, but also for the transmission of control data. In particular, reference can be made to the international standard IEEE 802.1.

Furthermore, the transmission bandwidth is sufficiently large, at least for the direction from the automation system 8 to the human-machine interface 17, that at least one video data stream with a resolution of 800 times 600 pixels per video frame and 20 video frames per second can be transmitted within the specified maximum latency time. The video frame is at least a grayscale image with a bit depth of 8 bits. Of course, it is better if the data network 16 offers even better performance, e.g. if 2, 4, 6, 8, etc. such video data streams can be transmitted, or a video stream with a higher resolution of, for example, 1600 times 1600 pixels per video frame or more than 20 video frames per second can be transmitted, or if the individual pixels have more than 8 bits, or are colored. Of course, combinations are also possible so that, for example, a single video data stream with a resolution of 1600 times 1600 pixels per video frame and 30 video frames per second in color can be transmitted, in addition to two further video data streams with a resolution of 800×800 pixels per video frame and 20 video frames per second each as grayscale images. These maximum latency times and bandwidths can be achieved in particular if the data network 16 (at least in one sub-section) is designed according to the 5G standard. However, the required maximum latency and the required bandwidth can also be implemented in other ways. In order to minimize the bandwidth actually required, the communication between the automation system 8 and the human-machine interface 17 can take place in particular in compressed form. Most particularly, the bandwidth required for the transmission of video data can be significantly reduced by using suitable standards, such as MPEG.

Furthermore, the communication between the automation system 8 and the human-machine interface 17 can preferably be encrypted. This makes hacking and the like sufficiently unlikely.

The transmitted signals can be output to the operator 19 via the human-machine interface 17. This applies equally to the "normal" signals as well as to the dimensional signals. In contrast to the prior art, however, it is generally not necessary for the operator 19 to actively intervene in the control of the primary industrial system. As a rule, it is sufficient for the operator 19 to monitor the system and only perform control interventions in individual cases.

Figure 5:
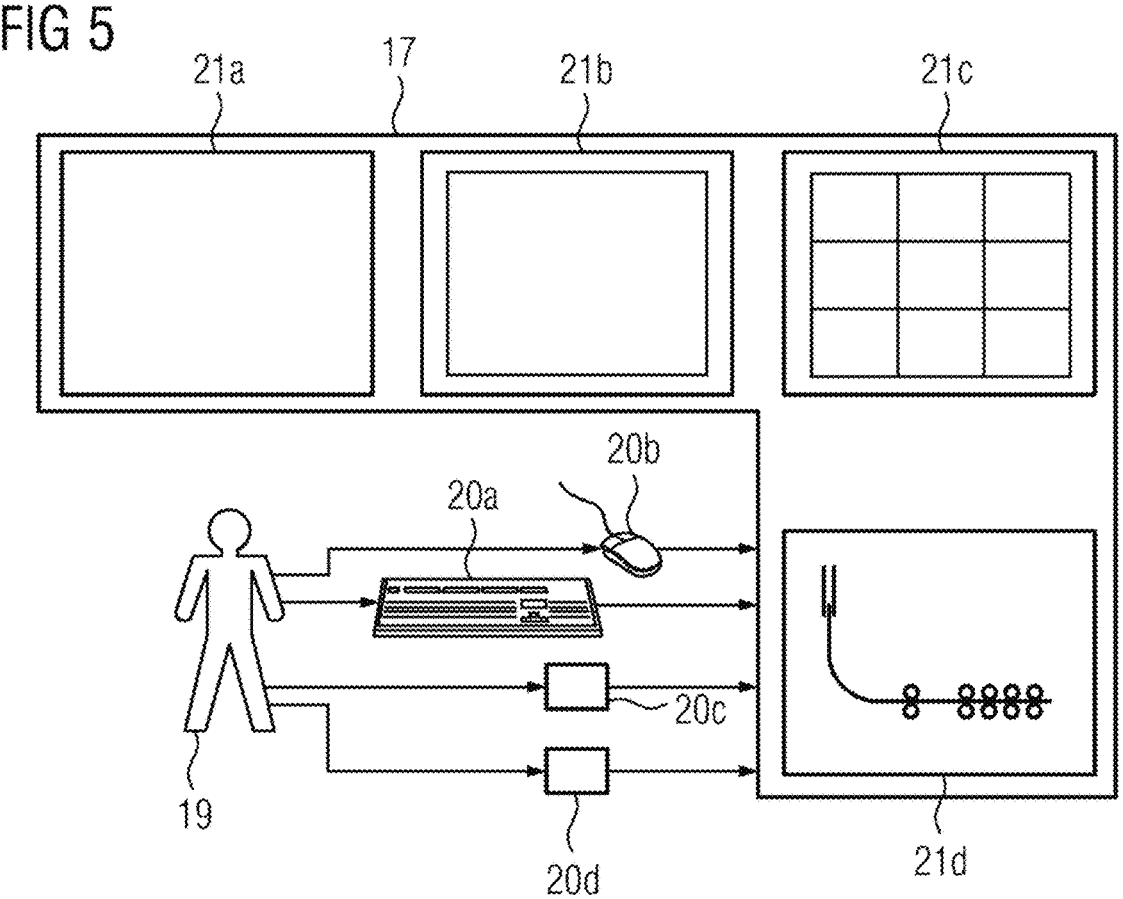
FIG. 5 shows the human-machine interface of FIG. 4.

For example, the human-machine interface 17 can have multiple monitors 21, as shown in FIG. 5. In this case, for example, "normal" status signals Z can be output via (at least) one monitor 21a, including any associated control signals S. But mostly, a further monitor 21b is available via which one of the dimensional signals—in particular an image—is displayed to the operator 19 in accordance with the transmission from the automation system 8 to the human-machine interface 17. If necessary, (at least) one additional monitor 21c can also be used to output images captured by means of multiple cameras distributed around the primary industrial system at specific locations. For this purpose, the monitor 21c can be divided into nine windows, each one showing a different image. The number of monitors 21 and which information is output to the operator 19 via which monitor 21 is only given as an example. What is important, however, is that only a part of the dimensional data—for example, only a part of the video data streams captured by the cameras on the system side—is output or—if other dimensional data is also output—this part has a higher resolution or is output at a higher resolution than the other dimensional data. Such dimensional data is referred to below as preferred dimensional data.

Another important point of the operating method is that the preferred dimensional data depends on the condition of the rolled product 2 and/or the system. This is explained below by assuming that a single video stream is output as the preferred dimensional data and that this video stream is output via the monitor 21b. However, the corresponding statements are generally valid.

For example, it is possible for the automation system 8 to decide which dimensional signals it will actually transmit to the human-machine interface 17, depending on the condition of the rolled product 2 and/or the system. In this case, of course, it is also possible only to output the dimensional signals transmitted in each case (according to the example via the monitor 21b and, if present, the monitor 21c) to the operator 19. Alternatively, it is possible that while all the dimensional data—for example, the images captured by the cameras at the system location—is always transmitted from the automation system 8 to the human-machine interface 17, the human-machine interface 17 may decide, depending on the condition of the rolled product 2 and/or the system, which dimensional signals it outputs to the operator 19 and in what scope.

The decision as to which dimensional signals the automation system 8 transmits to the human-machine interface 17 and in what scope, or which dimensional signals the human-machine interface 17 outputs to the operator 19 in what scope, can be taken by the automation system 8 or the human-machine interface 17, for example if the system is designed as a rolling mill, depending on the location of a strip head 22 (i.e. the beginning of the strip) and/or the strip foot 14 in the rolling track.

A concrete example of this is given below:

It is assumed that the production line 5 of the system of FIG. 1 comprises four rolling stands 23a to 23d as illustrated in FIGS. 6 to 14—purely as an example. Furthermore, it is assumed that for each of the four rolling stands 23a to 23d a camera 24a to 24d is available, by means of which the region of the production line 5 behind the respective rolling stands 23a to 23d is captured. Assume that the rolled product 2 is a metal strip and the strip head 22 is currently being threaded through the individual rolling stands 23a to 23d of the production line 5.

Figure 6:
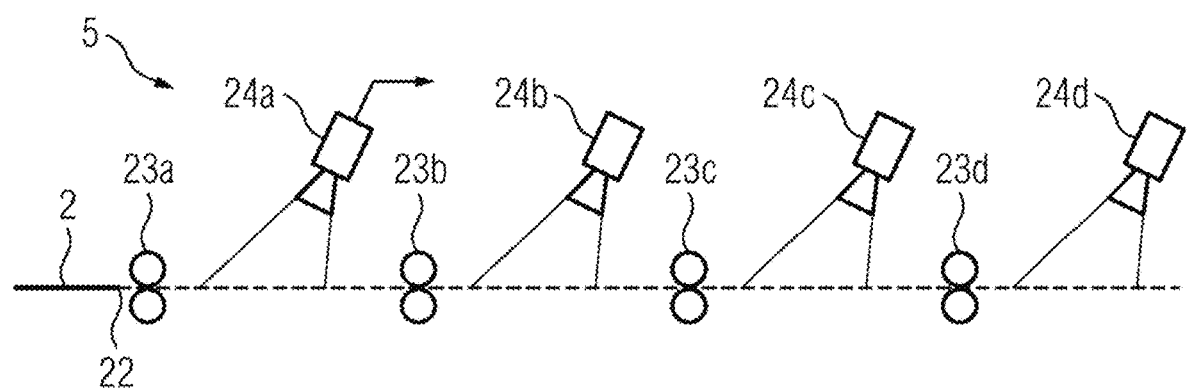
FIGS. 6 to 14 shows a production line during threading of a strip head.
Figure 7:
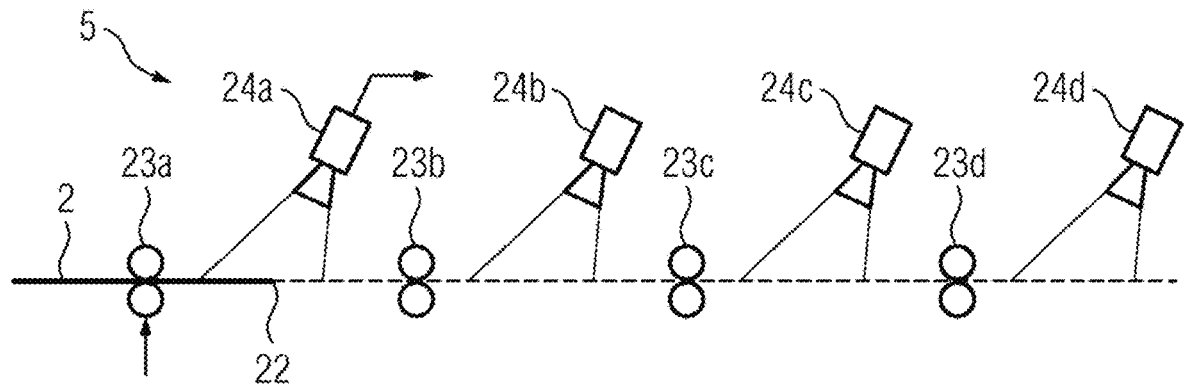
Figure 8:
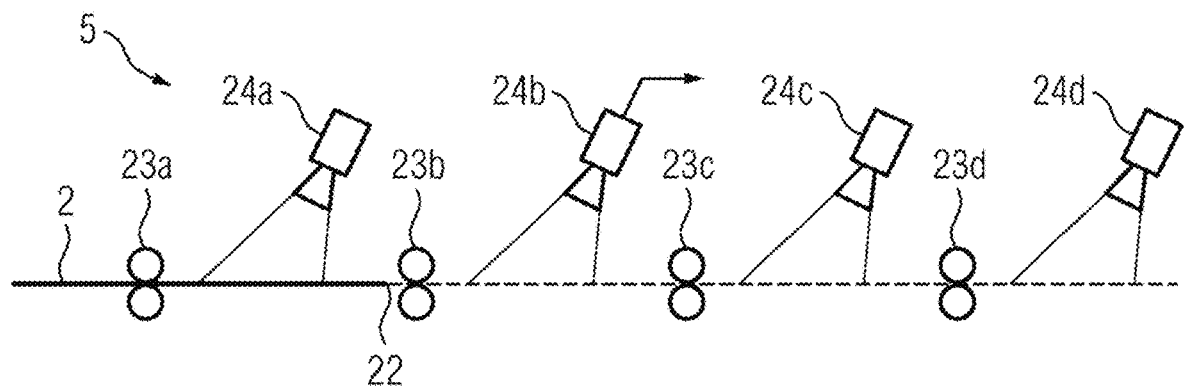
Figure 9:
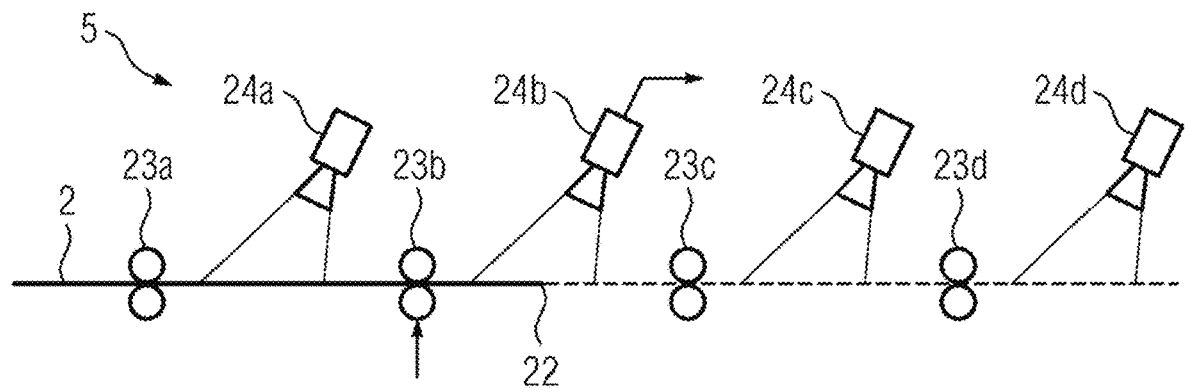
Figure 10:
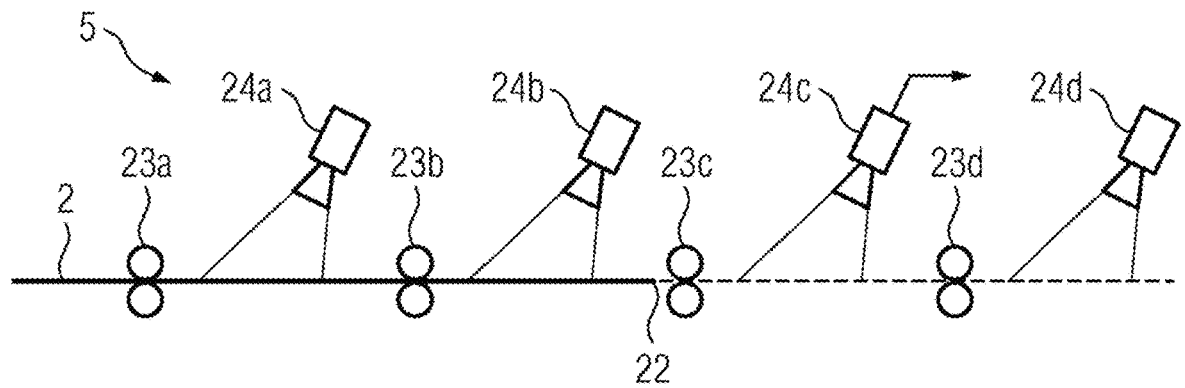
Figure 11:
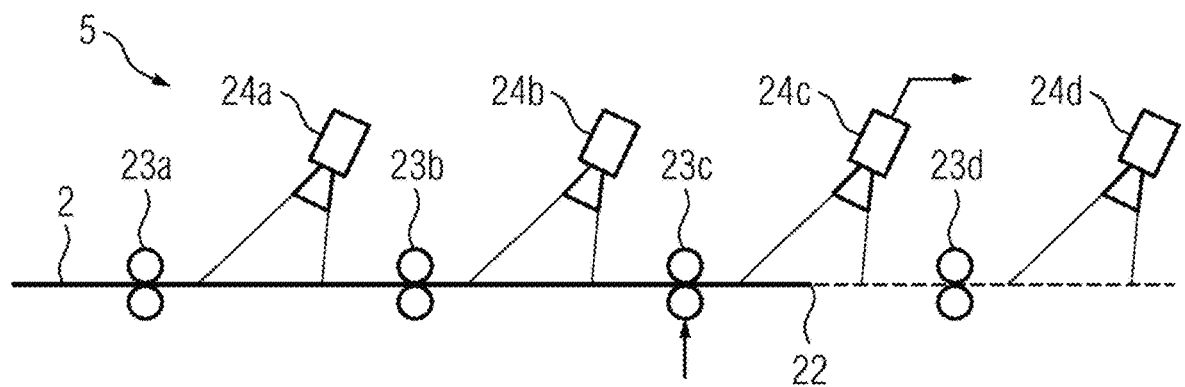
Figure 12:
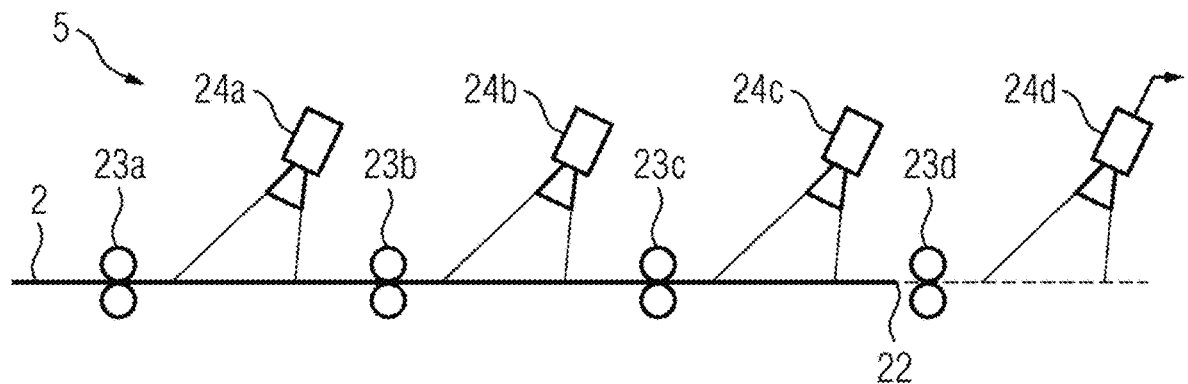
Figure 13:
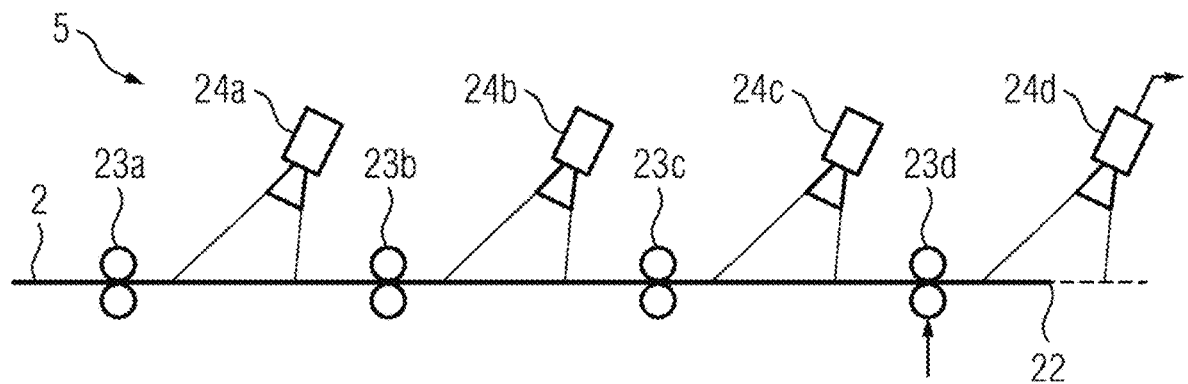
Figure 14:
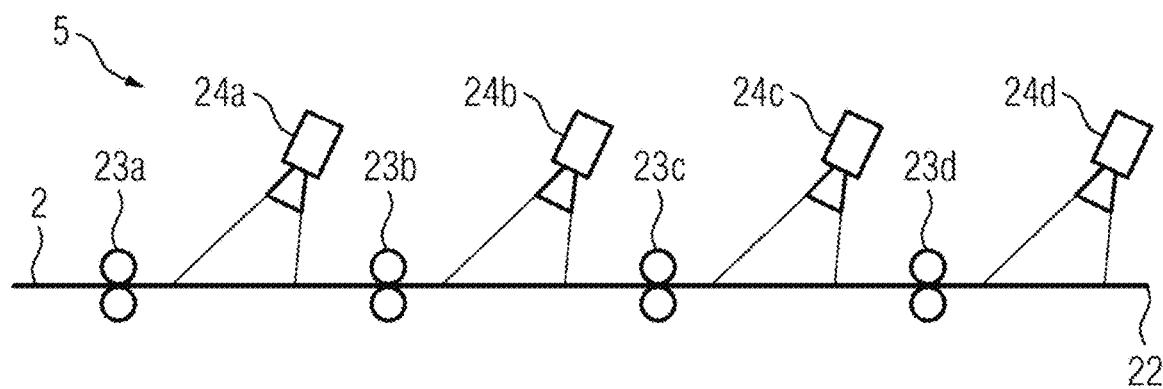

The strip head 22 is then located in sequence according to the illustration in FIG. 6 on the inlet side of the rolling stand 23a, according to the illustration in FIG. 7, on the outlet side of the rolling stand 23a and the inlet side of the rolling stand 23b, before reaching the coverage range of the camera 24a or in the coverage range of the camera 24a, according to the illustration in FIG. 8, on the outlet side of the rolling stand 23a and the inlet side of the rolling stand 23b, but no longer within the coverage range of the camera 24a, according to the illustration in FIG. 9, on the outlet side of the rolling stand 23b and the inlet side of the rolling stand 23c, before reaching the coverage range of the camera 24b or in the coverage range of the camera 24b, according to the illustration in FIG. 10, on the outlet side of the rolling stand 23b and the inlet side of the rolling stand 23c, but no longer within the coverage range of the camera 24b, according to the illustration in FIG. 11, on the outlet side of the rolling stand 23c and the inlet side of the rolling stand 23d, before reaching the coverage range of the camera 24c or in the coverage range of the camera 24c, according to the illustration in FIG. 12, on the outlet side of the rolling stand 23c and the inlet side of the rolling stand 23d, but no longer within the coverage range of the camera 24c, according to the illustration in FIG. 13, on the outlet side of the rolling stand 23d, before reaching the coverage range of the camera 24d or in the coverage range of the camera 24d, according to the illustration in FIG. 14, on the outlet side of the rolling stand 23d, but no longer within the coverage range of the camera 24d.

In this case, for example from a time when the strip head 22 is still located on the inlet side of the rolling stand 23a, the video image of the camera 24a can be output via the monitor 21b, from the time when the strip head 22 exits the coverage range of the camera 24a, the video image of the camera 24b can be output via the monitor 21b, from the time when the strip head 22 exits the coverage range of the camera 24b, the video image of the camera 24c can be output via the monitor 21b, from the time when the strip head 22 exits the coverage range of the camera 24c, the video image of the camera 24d can be output via the monitor 21b and from the time when the strip head 22 exits the coverage range of the camera 24d, none of the video images captured by the cameras 24a to 24d can be output via the monitor 21b.

This is indicated in FIGS. 6 to 14 by the fact that, according to the respective location of the strip head 22 for the corresponding camera 24a to 24d, an arrow indicates the video image output from the respective camera 24a to 24d, which image is currently being output to the monitor 21b, while the video images output by the other cameras 24a to 24d are not shown.

Of course, similar procedures are also possible when the strip foot 14 is unthreaded from the rolling stands 23a to 23d. Similar procedures are also possible for other situations.

It is possible, of course, to also adopt mixed approaches. For example, in addition to the procedure described above, it is possible to output the video images captured by the cameras 24a to 24d (in addition to other video images, if appropriate) permanently via the monitor 21c, but only in reduced form (i.e. with reduced resolution, e.g. 400×300 pixels) and/or with reduced frame rate (e.g. updated once per second).

In a similar way, the human-machine interface 17 determines the specifications V not only as a function of the actuation of the predefined controls 20 but additionally as a function of the status of the rolled product 2 and/or the system. Actuating the same control 20 can therefore result in a different specification V depending on the status of the rolled product 2 and/or the system.

An example of this is also given below:

As before, it is assumed that the strip head 22 is threaded sequentially through the rolling stands 23a to 23d of the production line 5 in turn, as illustrated in FIGS. 6 to 14. As a rule, the rolling stand 23a to 23d that is currently directly upstream of the strip head 22 is pivoted. This is indicated in FIGS. 6 to 14 by an arrow on the respective rolling stand 23a to 23d, the rolling gap wedge of which is adjusted by pivoting. If, for example, the strip head 22 is located between the rolling stands 23b and 23c, the rolling stand 23b is pivoted. This applies at least until the strip head 22 leaves the coverage range of the camera 24a to 24d arranged on the outlet side of the respective rolling stand 23a to 23d.

As a rule, the rolling stands 23a to 23d are pivoted automatically by the automation system 8. However, it is possible that the operator 19 recognizes that the activation of the corresponding rolling stand 23a to 23d is faulty or insufficient. In this case, the operator 19 can, for example, by pressing the control key 20c of the human-machine interface 17, specify a command B, the corresponding specification V of which has the effect on the automation system 8 of causing the roller gap of the corresponding rolling stand 23a to 23d to increase on the drive side of the corresponding rolling stand 23a to 23d and to decrease on the operating side of the corresponding rolling stand 23a to 23d. On the other hand, if the operator 19 presses the 20d control key this has the opposite effect. In both cases, however, the activation of the control keys 20c, 20d does not always affect the same rolling stand 23a to 23d (for example, the rolling stand 23a), but always affects that rolling stand 23a to 23d which is currently directly upstream of the strip head 22, i.e. from which the strip head 22 has last exited.

In order to make it even easier for the operator 19 to understand what is happening in the primary industrial system, a geometric-structural model 25 of the system can be implemented in the human-machine interface 17, as illustrated in FIG. 5. In this case, the human-machine interface 17 outputs at least a part of the geometric-structural model 25 to the operator 19 at least temporarily. For example, as illustrated in FIG. 5, an additional monitor 21d may be present that outputs the geometric-structural model 25 or the part of this model 25 to the operator 19.

Figure 15:
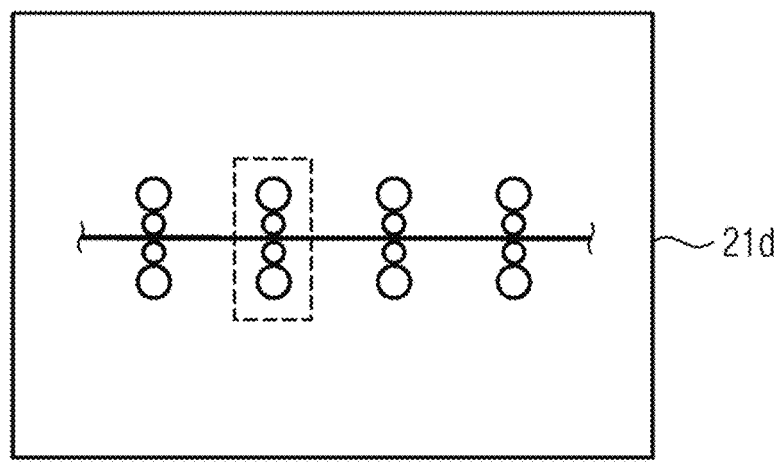
FIG. 15 shows a display of a geometric-structural model of a system from the primary industries.

The geometric-structural model 25 is usually a three-dimensional model. The display of the model 25, by contrast, is two-dimensional. However, the display can be a sectional view, a plan view (from above), a side view (e.g. seen from the operating side of the rolling stands 23a to 23d), etc., as required. FIG. 15 shows a purely exemplary two-dimensional display of the rolling stands 23a to 23d from the side, as can be output to the operator 19 via the monitor 21d, for example. Regardless of the type of display however, the human-machine interface 17 visually highlights, in the output portion of the geometric-structural model 25, the region that the automation system 8 transmits to the human-machine interface 17 depending on the status of the rolled product 2 and/or the system, and/or from the region of which the dimensional signals originate, which the human-machine interface 17 outputs to the operator 19 depending on the status of the rolled product 2 and/or the system, and/or for which the specifications V are determined which the human-machine interface 17 dynamically determines depending on the status of the rolled product 2 and/or the system. In the event that there are more than one such regions, the human-machine interface 17 highlights at least one of these regions. If applicable, additional information can be overlaid on this display, for example for the current meaning of the control keys 20c and 20d.

Again, an example of this is given:

As before, it is assumed that the strip head 22 is threaded sequentially through the rolling stands 23a to 23d of the production line 5 in turn, as illustrated in FIGS. 6 to 14. Then, for example, in the display of the geometric-structural model 25 of the system the respective rolling stand 23a to 23d which is currently directly upstream of the strip head 22 can be visually highlighted. If, for example, the strip head 22 is located between the rolling stands 23b and 23c, the rolling stand 23b will be visually highlighted. This is indicated in FIG. 15 by a dashed border around the rolling stand 23b. In the same way, for example, during the unthreading of the strip foot 14, the rolling stand 23a to 23d which the strip foot 14 will enter next can be highlighted dynamically.

It is possible that the human-machine interface 17 is the only human-machine interface 17 arranged at the operating location. However, it is also possible, as illustrated in FIG. 16, to have at least one other human-machine interface 17', 17" arranged at the operating location in addition to the human-machine interface 17. The first-mentioned human-machine interface 17 is therefore only one of a plurality of human-machine interfaces 17, 17', 17" of a whole group of human-machine interfaces 17, 17', 17" arranged at the operator location. The other human-machine interfaces 17', 17" can, for example, each control further primary industrial systems via the data network 16—statically or dynamically—or interact with their automation system 8', 8", as illustrated in FIG. 16. The other primary industrial systems and also their automation systems 8', 8" can be identical to the first system or different from it.

In the case of multiple human-machine interfaces 17, 17', 17" arranged at the operating location, the human-machine interfaces 17, 17', 17" are preferably networked with each other via a data connection 26, as illustrated in FIG. 16. This allows in particular the operator 19 to dynamically specify which of the human-machine interfaces 17 of the specified group communicates with the automation system 8 of the system. The operator 19 can therefore transfer the communication with the automation system 8 dynamically from the human-machine interface 17 to one of the other human-machine interfaces 17', 17" and back by specifying appropriate transfer commands. Under normal circumstances, for example, the human-machine interface 17 can interact with the primary industrial system shown in the center. However, it is possible to transfer the interaction temporarily to the human-machine interface 17', for example. This is indicated in FIG. 16 by the dashed double arrow between the two human-machine interfaces 17, 17' in question. The transfer of the interaction can be complete, if required, or may include only part of the control of the primary industrial system.

For example, the operator 19 can specify to the human-machine interface 17 a general transfer command, which only specifies the other human-machine interface 17', 17" to which the communication is to be transferred. In this case, communication is only transferred by the specification of the general transfer command. Alternatively, the operator 19 can select separable parts of the system control in a menu or similar and transfer the communication for the selected parts to the other human-machine interface 17', 17" by specifying a specific transfer command.

As indicated in FIG. 1, a control station 27 can also be arranged at the system location. The control station 27 can have the full functionality or part of the functionality of the human-machine interface 17. Using the control station 27, the operator 19 or another operator 19' can, if necessary, specify commands B' which are converted by the control station 27 into specifications V' for the automation system 8. This means that, if necessary—for example during maintenance of the system or in a kind of emergency operation of the system or if control of the system on site is intended for other reasons—a direct control of the system can be carried out using the control station 27 arranged on site. This control is performed by bypassing the data network 16 and the human-machine interface 17. The commands B' and the specifications V' corresponding to them can be identical to the commands B and the specifications V which are accepted by the human-machine interface 17 or transmitted via the data network 16 to the automation system 8 in normal operation.

The present invention has many advantages. In particular, a means is created for controlling a plant for producing and/or treating a rolled product 2 made of metal, i.e. a plant for which a short response time must be guaranteed, remotely from any operating location. The operator 19 is relieved of manual control interventions to a considerable extent. The dynamic display of dimensional signals allows the number of required monitors 21a to 21d and thus the complexity of monitoring the system to be kept within manageable limits. In addition, the operator 19 is relieved of operator input for switching between video images, for example. As a result, the operation is considerably simplified. The arrangement of a plurality of human-machine interfaces 17, 17', 17" at the operating location, wherein the human-machine interfaces 17, 17', 17" are networked with each other, enables increased flexibility and efficiency to be achieved in the control of multiple systems. For example, if certain problems occur in the control of the system, the control can be relocated from the human-machine interface 17 to another human-machine interface 17', 17", the operator 19 of which has better expertise in this regard.

Although the invention has been illustrated and described in greater detail by means of the preferred exemplary embodiment, the invention is not restricted by the examples disclosed and other variants can be derived therefrom by the person skilled in the art without departing from the scope of protection of the invention.

LIST OF REFERENCE SIGNS 1, 3 subsystems
2 rolled product
4 roughing rolling mill
5 production line
6 reel
7 cooling track
8, 8', 8" automation systems
9 sensors
10 units
11 actuators
12 coil
13, 24a to 24d camera
14 strip end
15 coil eye
16 data network
17, 17', 17" human-machine interfaces
18 other components
19, 19' operators
20, 20a to 20d controls
21, 21a to 21d monitors
22 strip head
23a to 23d rolling stands
25 geometric-structural model
26 data link
27 control station
B, B' commands
S control signals
V, V' specifications
Z status signals

The invention claimed is:

1. An operating method for a plant for producing and/or treating a rolled product made of metal,
   wherein significant status signals (Z) for states of units of the system are detected by means of sensors,
   wherein the detected status signals (Z) are transmitted from the sensors to an automation system,
   wherein some of the status signals (Z) recorded by the sensors are dimensional signals,
   wherein dimensional signals are signals in which a single individual measured value only provides meaningful information about the status of the rolled product relative to a specific unit of the system or the system itself if it also takes into account the values adjacent to it in time and/or location,
   wherein the automation system, by taking into account the transmitted status signals (Z), determines control signals (S) for actuators associated with the units and activates the actuators according to the determined status signals (Z),
   wherein the automation system determines part of the control signals (S) by taking into account the dimensional signals,
   wherein the automation system comprises at least one model-based system which models the behavior of the system and/or the rolled product in real time on the basis of mathematical-physical equations,
   wherein the automation system feeds part of the status signals (Z) to the model-based system and determines part of the control signals (S) for the actuators by means of the model-based system,
   wherein the automation system transmits at least part of the status signals (Z), the control signals (S), and/or signals derived from the status signals (Z) and/or the control signals (S), via an open data network to a human-machine interface arranged at an operating site,
   wherein an open data network is a data network in which the automation system and the human-machine interface have no knowledge as to whether, and if so which, other components are connected to the data network,
   wherein the signals transmitted to the human-machine interface comprise at least one of the dimensional signals,
   wherein the human-machine interface accepts commands (B) from an operator by operating predefined controls of the human-machine interface and transmits specifications (V) corresponding to the commands (B) to the automation system via the open data network,
   wherein the automation system takes the specifications (V) into account when determining the control signals (S),
   wherein the transmission over the open data network takes place in both communication directions with a probability of at least 99.95% with a maximum latency time of 50 ms and the bandwidth of the transmission between the automation system and the human-machine interface is sufficiently large that at least one video data stream with a resolution of 800×600 pixels per video frame and 20 video frames per second can be transmitted within the maximum latency time,
wherein the automation system selects which dimensional signals it transmits to the human-machine interface according to the production status of the rolled product and/or the system, and/or the human-machine interface selects which dimensional signals it outputs to the operator and in which scope according to the production status of the rolled product and/or the system,
wherein the human-machine interface determines the specifications (V) dynamically as a function of the actuation of the predefined controls and additionally as a function of the status of the rolled product and/or the system;
wherein the human machine interface includes a plurality of monitors, and
wherein at least a first one of the plurality of monitors displays the status signals (Z), while a second one of the plurality of monitors displays dimensional signals selected and transmitted to the human-machine interface by the automation system, or selected by the human-machine interface.

2. The operating method as claimed in claim 1, wherein the system comprises a continuous casting system and/or a rolling mill with or without a cooling track downstream of the rolling mill, and/or a treatment line for thermal treatment and/or surface treatment of the rolled product.

3. The operating method as claimed in claim 1, wherein at least one sub-section of the open data network is designed at least in accordance with the 5G standard.

4. The operating method as claimed in claim 1, wherein a geometric-structural model of the system is implemented in the human-machine interface, that the human-machine interface outputs at least part of the geometric-structural model to the operator and that the human-machine interface visually highlights, in the output geometric-structural model or in the output portion of the geometric-structural model, the region or at least one of the regions that the automation system transmits to the human-machine interface depending on the status of the rolled product and/or the system, and/or from the region of which the dimensional signals originate, which signals the human-machine interface outputs to the operator depending on the status of the rolled product and/or the system, and/or for which the specifications (V) are determined which the human-machine interface dynamically determines depending on the status of the rolled product and/or the system, wherein the geometric structural model is displayed by a third monitor of the plurality of monitors.

5. The operating method as claimed in claim 4, wherein the human-machine interface further includes a fourth monitor to display images from multiple locations in the plant simultaneously.

6. The operating method as claimed in claim 1, wherein the communication between the automation system and the human-machine interface takes place in compressed form.

7. The operating method as claimed in claim 1, wherein the communication between the automation system and the human-machine interface is encrypted.

8. The operating method as claimed in claim 1, wherein in addition to the human-machine interface, at least one other human-machine interface which is networked with the human-machine interface is arranged at the operating location, and that the operator can transfer communication with the automation system dynamically from the human-machine interface to the other human-machine interface and back by specifying appropriate transfer commands.

9. The operating method as claimed in claim 1, wherein at least part of the status signals (Z) fed to the model-based system from the automation system are dimensional signals.

10. An integral plant for producing and/or treating a rolled product made of metal,
wherein the integral plant has sensors arranged at the location of the system, by means of which significant status signals (Z) for states of units of the plant are detected,
wherein the integral plant has an automation system which is connected to the sensors for transmitting the detected status signals (Z) from the sensors to the automation system,
wherein part of the status signals (Z) detected by the sensors are dimensional signals,
wherein dimensional signals are signals in which a single individual measured value only provides meaningful information about the status of the rolled product relative to a specific unit of the plant or the plant itself if it also takes into account the values adjacent to it in time and/or location,
wherein the integral plant has actuators arranged at the location of the plant, which are associated with the units and are connected to the automation system for actuating the actuators according to determined control signals (S),
wherein the automation system determines the control signals (S) for the actuators taking into account the transmitted status signals (Z),
wherein the automation system determines part of the control signals (S) by taking into account the dimensional signals,
wherein the automation system comprises at least one model-based system which models the behavior of the system and/or the rolled product in real time on the basis of mathematical-physical equations,
wherein the automation system feeds part of the status signals (Z) to the model-based system and determines part of the control signals (S) for the actuators by means of the model-based system,
wherein the integral plant has a human-machine interface arranged at an operating location, which is connected to the automation system via an open data network,
wherein an open data network is a data network in which the automation system and the human-machine interface have no knowledge as to whether, and if so which, other components are connected to the data network,
wherein the automation system transmits at least part of the status signals (Z), the control signals (S), and/or signals derived from the status signals (Z) and/or the control signals (S), via the open data network to the human-machine interface,
wherein the signals transmitted to the human-machine interface comprise at least one of the dimensional signals,
wherein the human-machine interface accepts commands (B) from an operator by operating predefined controls of the human-machine interface and transmits specifications (V) corresponding to the commands (B) to the automation system via the open data network,
wherein the automation system takes the specifications (V) into account when determining the control signals (S),
wherein the transmission over the open data network takes place in both communication directions with a probability of at least 99.95% with a maximum latency time of 50 ms and the bandwidth of the transmission between the automation system and the human-machine interface is sufficiently large that at least one video data stream with a resolution of 800×600 pixels per video frame and 20 video frames per second can be transmitted within the maximum latency time, wherein the automation system selects which dimensional signals it transmits to the human-machine interface according to the production status of the rolled product and/or the system, and/or the human-machine interface selects which dimensional signals it outputs to the operator and in which scope according to the production status of the rolled product and/or the system, wherein the human-machine interface determines the specifications (V) dynamically as a function of the actuation of the predefined controls and additionally as a function of the status of the rolled product and/or the system wherein the human machine interface includes a plurality of monitors, and wherein at least a first one of the plurality of monitors displays the status signals (Z), while a second one of the plurality of monitors displays dimensional signals selected and transmitted to the human-machine interface by the automation system, or selected by the human-machine interface.

11. The integral plant as claimed in claim 10, wherein the system comprises a continuous casting system and/or a rolling mill with or without a cooling track downstream of the rolling mill, and/or a treatment line for thermal treatment and/or surface treatment of the rolled product.

12. The integral plant as claimed in claim 10, wherein at least one sub-section of the open data network is designed at least in accordance with the 5G standard.

13. The integral plant as claimed in claim 10, wherein a geometric-structural model of the system is implemented in the human-machine interface, that the human-machine interface outputs at least part of the geometric-structural model to the operator and that the human-machine interface visually highlights, in the output geometric-structural model or in the output portion of the geometric-structural model, the region or at least one of the regions that the automation system transmits to the human-machine interface depending on the status of the rolled product and/or the system, and/or from the region of which the dimensional signals originate, which the human-machine interface outputs to the operator depending on the status of the rolled product and/or the system, and/or for which the specifications (V) are determined which the human-machine interface dynamically determines depending on the status of the rolled product and/or the system, wherein the geometric structural model is displayed by a third monitor of the plurality of monitors.

14. The integral plant as claimed in claim 13, wherein the human-machine interface further includes a fourth monitor to display images from multiple locations in the plant simultaneously.

15. The integral plant as claimed in claim 10, wherein the communication between the automation system and the human-machine interface takes place in compressed form.

16. The integral plant as claimed in claim 10, wherein the communication between the automation system and the human-machine interface is encrypted.

17. The integral plant as claimed in claim 10, wherein in addition to the human-machine interface, the integral plant at the operating location has at least one other human-machine interface which is networked with the human-machine interface, and that the operator can transfer communication with the automation system dynamically from the human-machine interface to the other human-machine interface and back by specifying appropriate transfer commands.

18. The integral plant as claimed in claim 10, wherein at least part of the status signals (Z) fed to the model-based system from the automation system are dimensional signals.

* * * * *